United States Patent [19]
Gromotka

[11] Patent Number: 6,105,918
[45] Date of Patent: Aug. 22, 2000

[54] SINGLE PIECE ADJUSTABLE HANGER BAR FOR LIGHTING FIXTURES

[75] Inventor: Gabriel P. Gromotka, Hanover Park, Ill.

[73] Assignee: Cooper Technologies Company, Houston, Tex.

[21] Appl. No.: 09/065,591

[22] Filed: Apr. 24, 1998

[51] Int. Cl.$^7$ .................................................. B42F 13/00
[52] U.S. Cl. ...................... 248/343; 248/205.1; 248/906; 248/909
[58] Field of Search ..................... 248/343, 201, 248/344, 342, 903, 906, 909, 205.1

[56] References Cited

U.S. PATENT DOCUMENTS

| | | | |
|---|---|---|---|
| 1,622,087 | 3/1927 | Calderwood | 248/343 |
| 1,791,480 | 2/1931 | Smith et al. | 174/63 |
| 2,518,515 | 8/1950 | Austin | 248/228.7 |
| 2,713,983 | 7/1955 | Kay | 248/57 |
| 2,802,933 | 8/1957 | Broadwin | 362/366 |
| 3,104,087 | 9/1963 | Budnick et al. | 248/343 |
| 3,597,889 | 8/1971 | LoNigro | 52/28 |
| 4,149,693 | 4/1979 | LoNigro | 248/342 |
| 4,757,967 | 7/1988 | Delmore et al. | 248/218.4 |
| 4,967,990 | 11/1990 | Rinderer | 248/205.1 |
| 4,972,339 | 11/1990 | Gabrius | 362/366 |
| 5,176,345 | 1/1993 | Medlin | 248/205.1 |
| 5,209,444 | 5/1993 | Rinderer | 248/205.1 |
| 5,386,959 | 2/1995 | Laughlin et al. | 248/205.1 |
| 5,619,263 | 4/1997 | Laughlin et al. | 248/343 |

OTHER PUBLICATIONS

Halo Lighting, "Edison Recessed Lighting", Cooper Industries, No. ADV 693025, Jan. 1984.
"Edison Lighting", ET 7001 P, Cooper Industries, 694917, Sep. 1989.
"Eidson Lighting", ET 7070, ET 7071, ET 7301, ET 7401, ET 7410, Cooper Industries, 694979, Dec. 1987.
Sears Owners Manual, Model No. 9 89575, 694954, Oct. 1987.
Halo, H–7T, H27T, H–71CT, H274, H275, Bar Hanger Installation Instruction, 695876, Jun. 1989.
Halo H7 Housing with Improved Plaster Frame, Cooper Industries, 692601, Jul. 1981.

*Primary Examiner*—Anita M. King
*Attorney, Agent, or Firm*—Fish & Richardson PC

[57] ABSTRACT

A hanger bar includes a longitudinally elongated body that has a first end region and a second end region. The elongated body is bendable at one or more locations near or within the first end region. Furthermore, the second end region has a mounting flange and a longitudinally flexible area. The mounting flange extends perpendicularly to the longitudinal body. The improved hanger bar can be installed by measuring a distance between spaced support members and transferring the measured distance to the hanger bar. Then, the hanger bar is bent near the first end region so that the longitudinal length of the hanger bar, after being bent, is no greater than the measured distance. Installation is completed when the second end region is fastened to one of the support members and the first end region is fastened to another one of the support members.

15 Claims, 6 Drawing Sheets

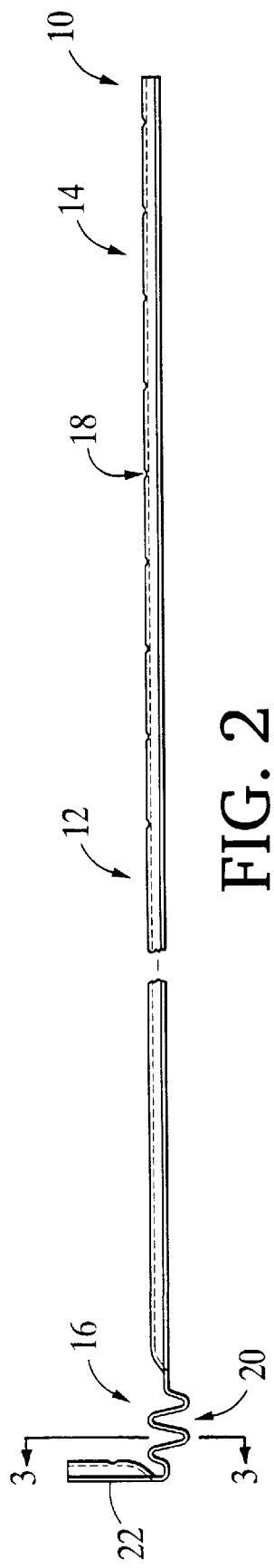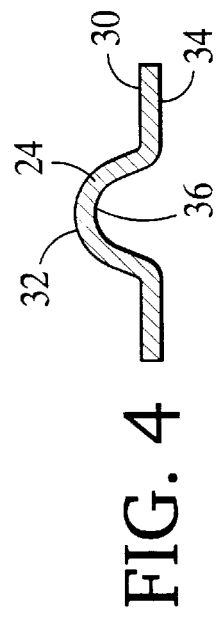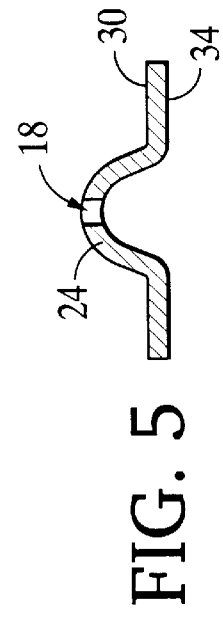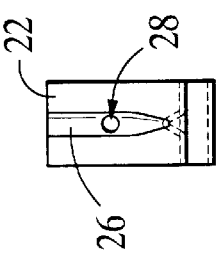

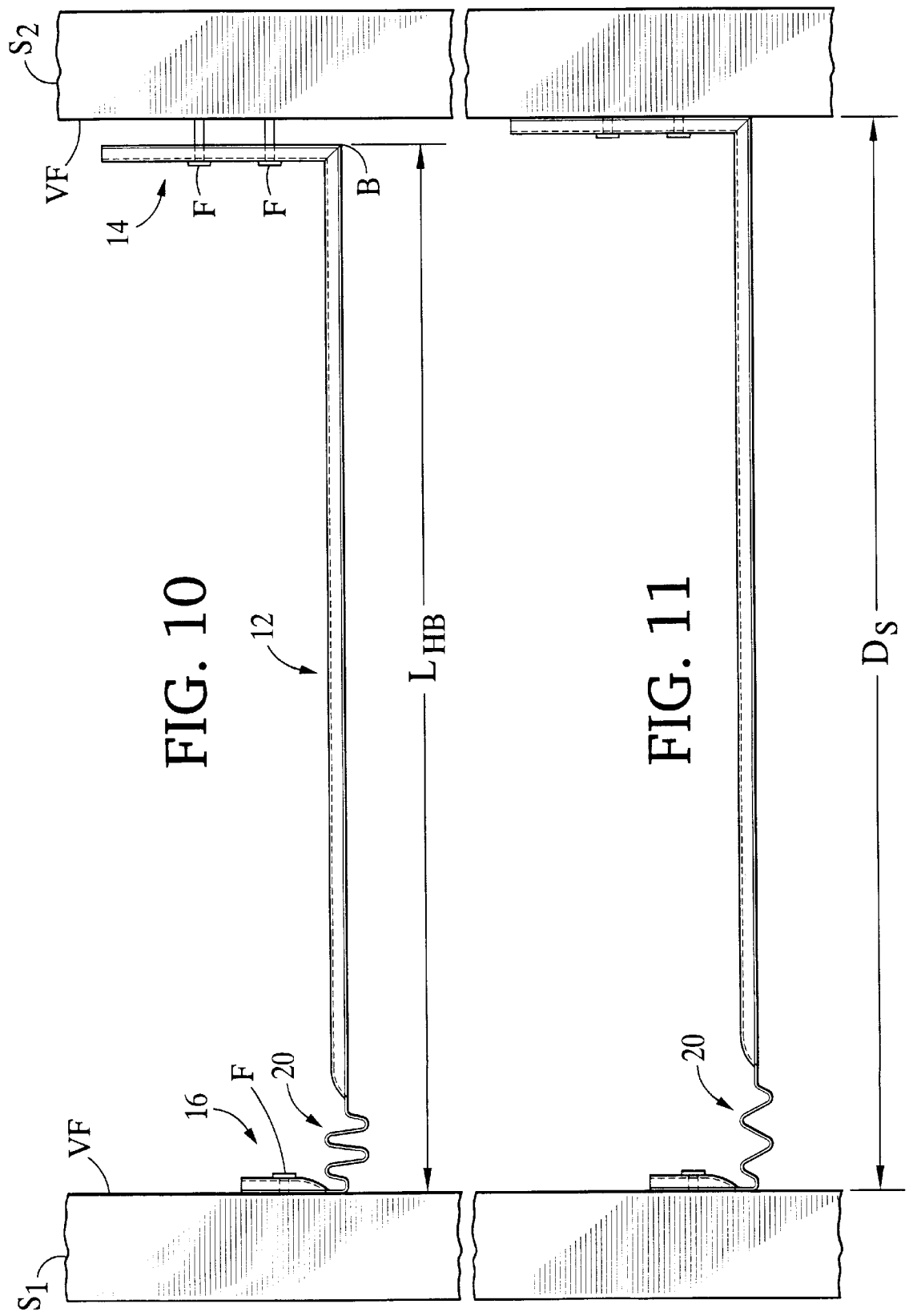

SINGLE PIECE ADJUSTABLE HANGER BAR FOR LIGHTING FIXTURES

BACKGROUND OF THE INVENTION

1. Field of the Invention

This invention generally relates to hanger bars and their installation. In particular, it relates to a one-piece hanger bar structure useful in mounting suspended light fixtures between spaced supports.

2. Related Art

Hanger bars are frequently used to mount light fixtures between spaced supports or joists. The ends of the hanger bars are fastened to vertical faces of the supports by nailing or other means, and the light fixture is suspended between spaced hanger bars. The distance between supports or joists can vary to a considerable degree. Therefore, it is desirable for the hanger bars to have an adjustable length.

Hanger bars constructed from two interfitting members that slide in a telescoping manner have been introduced to provide the desired adjustable-length feature. However, this two-piece construction has certain drawbacks. First, the manufacture of the two pieces is relatively complicated and costly. Second, the two pieces must be assembled subsequent to manufacture, thereby adding additional cost and complexity. Third, the two-piece design is prone to "sag" or be deflected by the weight of the suspended light fixture.

Therefore it would be desirable to provide a hanger bar construction that is adjustable in length, is relatively inexpensive to manufacture, does not require a subsequent assembly of multiple components, and is of sufficient strength and rigidity so as to resist sagging.

U.S. Pat. Nos. 4,149,693 and 3,597,889, both to LoNigro, each disclose a strap-iron support bar for mounting a junction box between inverted T-irons of a hanging grid-type ceiling. The ends of the support bar are bent to form U-shaped hooks that fit over the inverted T-irons. The length of the support bar is not disclosed as being adjustable.

U.S. Pat. No. 1,791,480 to Smith et. al. discloses a bar for hanging electrical fixtures. The bar includes a plurality spaced of nail holes that permit the position of the bar to be shifted to locate the light fixture in the desired location. The hanger bar is not designed to be mounted to the vertical surfaces of the ceiling joists, and is not disclosed as having an adjustable length.

OBJECTS AND SUMMARY

It is an object of the present invention to provide a hanger bar construction that is adjustable in length, is relatively inexpensive to manufacture, does not require a subsequent assembly of multiple components, and is of sufficient strength and rigidity so as to resist sagging. It is also an object of the present invention to provide a simple and effective hanger bar construction and method of installing such a hanger bar.

A hanger bar constructed according to the principles of the present invention may include a longitudinally elongated body having a first end region and a second end region, a plurality of longitudinally-spaced bend apertures disposed along a substantial portion of the longitudinal body and along the first end region, and the second end region having a mounting flange extending substantially perpendicular to the longitudinal body and a plurality of corrugations that are expandable and contractible in the longitudinal direction.

A method of installing a hanger bar constructed according to present invention may include measuring the distance between spaced support members, transferring the measured distance to the hanger bar, bending the hanger bar proximate the first end region at one of the bend apertures so that the longitudinal length of the hanger bar member, after being bent, is no greater than the measured distance, fastening the second end to one of the support members, and fastening the first end to another one of the support members.

BRIEF DESCRIPTION OF THE DRAWINGS

FIG. 2 is a top view of the hanger bar of FIG. 1.

FIG. 3 is a view of an end of the hanger bar taken along line 3—3.

FIG. 4 is a cross-sectional view taken along line 4—4 of FIG. 1.

FIG. 5 is a cross-sectional view taken along line 5—5 of FIG. 1.

FIG. 6 is a cross-sectional view taken along line 6—6 of FIG. 1.

FIG. 10 is a top view of the hanger bar of FIG. 1 in a partially-installed condition.

FIG. 11 is a top view of the hanger bar of FIG. 1 in a fully installed condition.

DETAILED DESCRIPTION OF THE PREFERRED EMBODIMENTS

Figures 1, 1A:
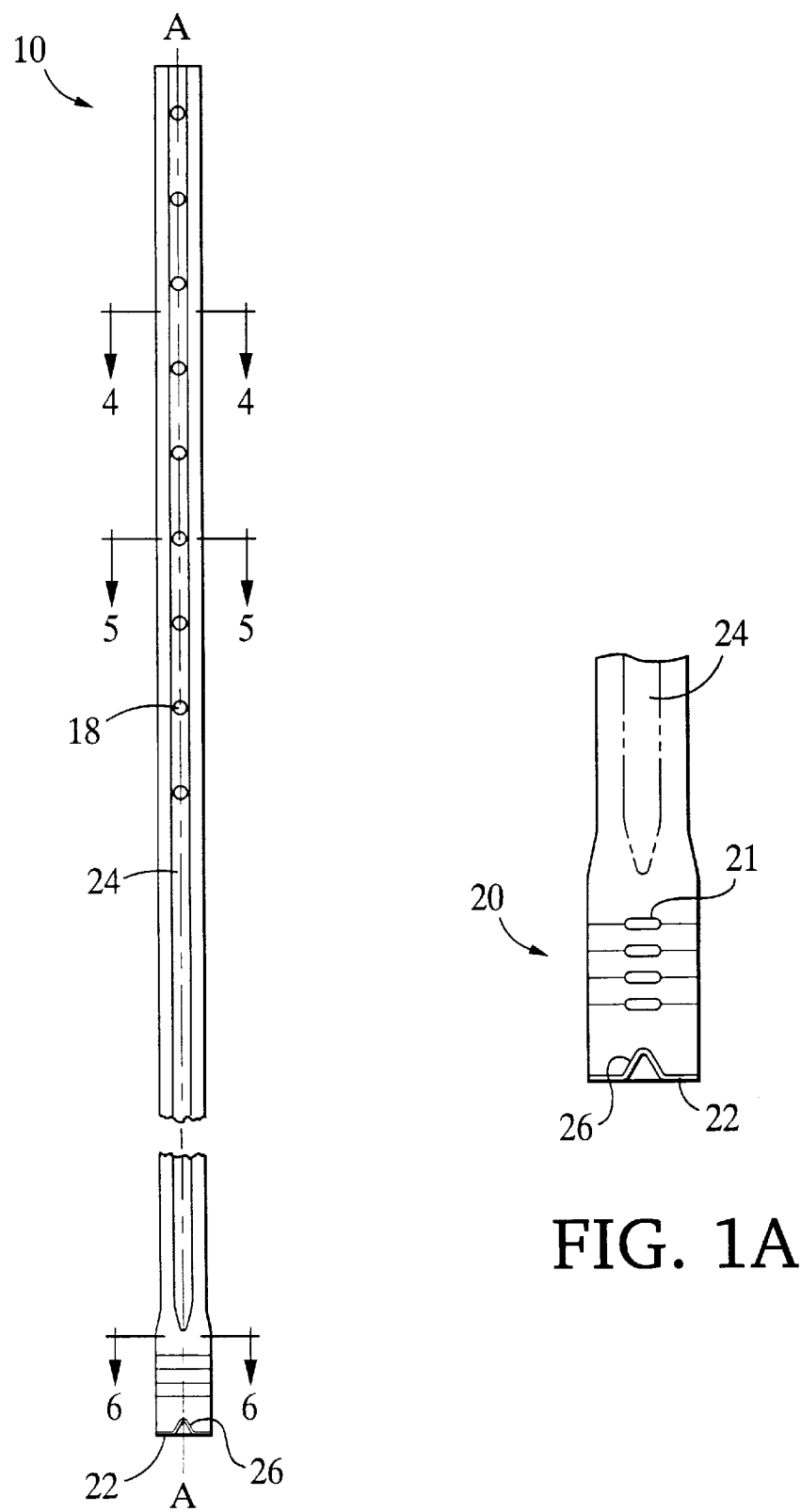
FIG. 1 is a side view of a hanger bar constructed according to the present invention.
FIG. 1A is a modified construction of the hanger bar of FIG. 1.

A hanger bar constructed according to the principles of the present invention, a method for installing the inventive hanger bar, and a suspended light fixture assembly incorporating the inventive hanger bar will now be discussed by reference to drawing FIGS. 1–13.

Various features of the hanger bar 10 are illustrated in FIGS. 1–11. The hanger bar 10 is generally in the form of bar-like member having a longitudinal axis A. The hanger bar 10 may be constructed from any suitable material, such as a strip of galvanized steel. The hanger bar 10 has a longitudinally elongated body region 12, a first end region 14, and a second end region 16. A plurality of bend apertures 18 are provided in a longitudinally-spaced manner along at least along a substantial portion of the longitudinal body region 12, and along the first end region 14. The bend apertures 18 provides a weak point that facilitates bending of the hanger bar for purposes of installation, as will be more fully described herein. The size and shape of the bend apertures may vary widely. For example, the bend apertures may be circular, oval, or polygonal (e.g.—diamond shaped, triangular, etc.).

A mounting flange 22 is provided in the second end region 16. In the illustrated embodiment, the mounting flange 22 is approximately perpendicular to the longitudinally elongated body 12. One or more fastener holes 28 are provided on the mounting flange 22 to facilitate attachment of the mounting flange 22 to a support member S.

A first reinforcing formation 24 is provided along at least a substantial portion of the longitudinal body 12, and in a preferred embodiment, extends throughout the first end region 14 as well. The reinforcing formation 24 can take any suitable form. In a preferred construction, the reinforcing formation 24 is generally ridge-like. A similar reinforcing formation 26 is disposed along at least a substantial portion of the mounting flange 22. The reinforcing formation 26 can take any suitable form. In a preferred construction, the reinforcing formation 26 is also generally ridge-like.

Figure 7:
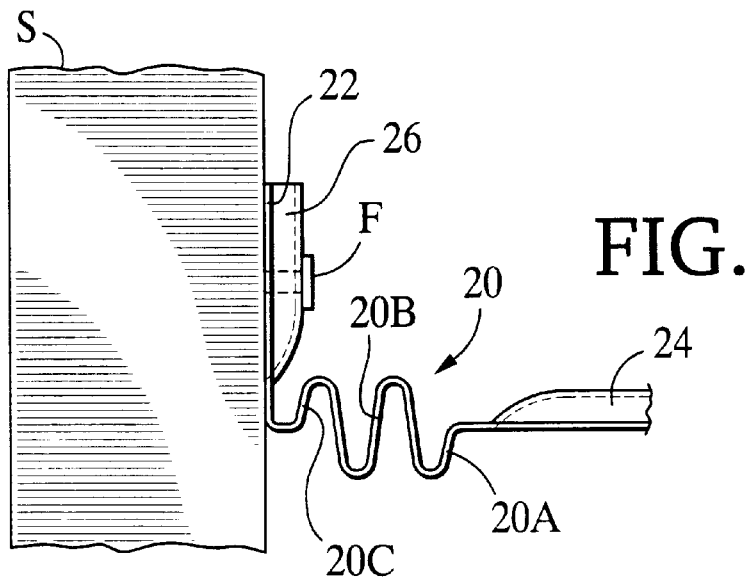
FIG. 7 is a partial top view of the hanger bar of FIG. 1 showing an end of the hanger bar in its initial unflexed state.
Figure 8:
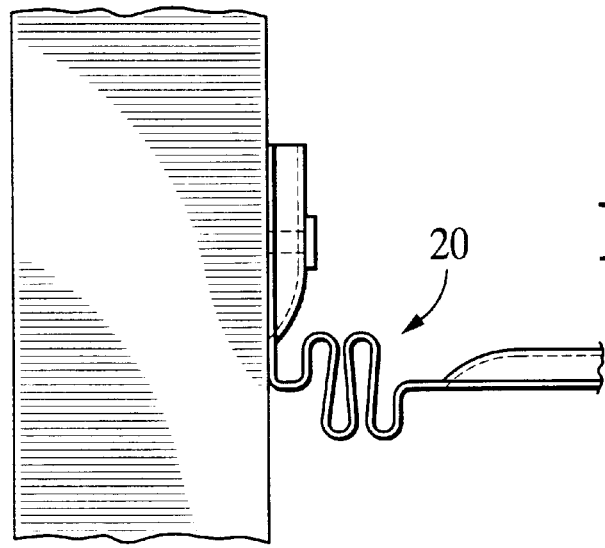
FIG. 8 is a partial top view of the hanger bar of FIG. 1 showing an end of the hanger bar in a compressed state.
Figure 9:
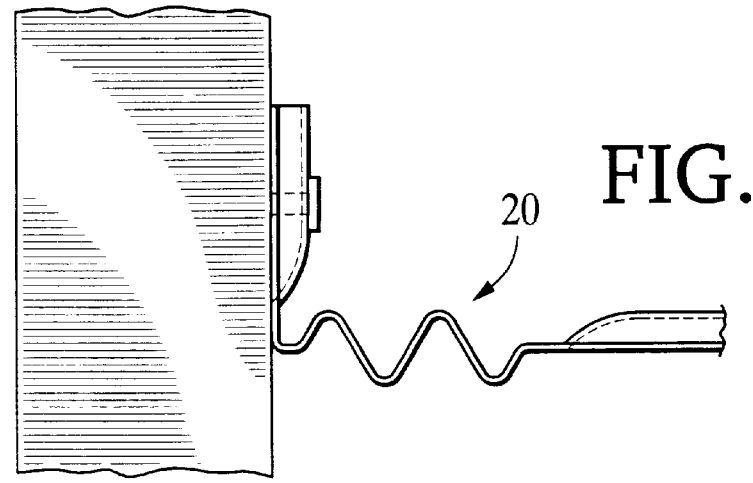
FIG. 9 is a partial top view of the hanger bar of FIG. 1 showing an end of the hanger bar in a stretched or extended state.

A corrugated area 20 is provided at the second end region 16. As best illustrated in FIGS. 7–9, the corrugated area gives the hanger bar 10 a degree of flexibility in the longitudinal direction. The corrugated area 20 is shown in its natural, unflexed state in FIG. 7. The corrugated area 20 is shown in a compressed state in FIG. 8, and in a stretched or elongated state in FIG. 9. The corrugated area 20 connects mounting flange 22 with the remainder of the hanger bar 10. The corrugated area 20 can take any suitable form. By way of example, the corrugated section can be generally sinusoidal. In the illustrated example, a first "half wave" 20A connects the corrugated region 20 with the remainder of the hanger bar 10. Another "half wave" 20C connects the corrugated area 20 with the mounting flange 22. At least one "full wave" 20B connects the "half waves" 20A and 20C.

In an alternative construction of the hanger bar 10 illustrated in FIG. 1A, a plurality of apertures 21 may be provided in the surface of the hanger bar in the area of the corrugated area 20. The apertures 21 improve the flexibility of the corrugated area 20 and facilitate expansion and contraction of the hanger bar 10. The apertures 21 can be provided at the "peaks" and "valleys" of the corrugations or "waves" 20A, 20B, and 20C. The apertures 21 can be of any suitable size and shape. In the illustrated embodiment, the apertures are substantially oval in shape. Alternatively, the apertures could be circular or polygonal (e.g.—triangular, diamond-shaped, etc.).

As noted above, the corrugated area 20 enables expansion and contraction of the hanger bar 10. This longitudinal flexibility is important in the installation process so that the hanger bar 10 can be readily expanded or contracted to fit between supports of various spacings. It is also important that the hanger bar have a ceratin degree of stiffness or rigidity so that it can adequately support a suspended member. The degree of longitudinal flexibility can be affected by numerous factors, such as the thickness of the hanger bar material, the properties of the hanger bar material, and the shape, size and number of corrugations or waves 20A, 20B, and 20C. An indication of the degree of flexibility possessed by the hanger bar 10 can be given by measuring the amount of force necessary to extend the hanger bar. The following table illustrates the force necessary to extend the hanger bar by applying a load to the ends of the hanger bar in opposite directions. For purposes of illustration the hanger bar is constructed of a strip of galvanized steel having a thickness of 0.024 inches.

| Extension Distance (inches) | Force (lbf.) |
| --- | --- |
| start (just prior to significant extension) | 12 |
| 0.25 | 18 |
| 0.50 | 21.5 |
| 0.75 | 25 |
| 1.0 | 32.0 |

A hanger bar requiring forces for expansion that approximate the above indicted forces generally possesses an acceptable degree of flexibility for most applications. It should be evident that it may be desirable to make the hanger bar more or less flexible to suit a particular application.

Certain cross-sectional features of the hanger bar 10 are illustrated in FIGS. 4–6. As previously noted, a reinforcing formation 24 is disposed along at least a substantial portion of the longitudinally-elongated body 12 in order to provide the hanger bar with stiffness and stability. More precisely, a preferred form of the hanger bar has a first surface 30 and a second surface 34. A substantially convex formation 32 is disposed on the first surface 30. A corresponding substantially concave formation 36 is disposed on the second surface 34. These formations 32, 36 may be formed by any suitable method, such as stamping or die pressing. FIG. 5 is a view similar to FIG. 4, and illustrates a bend aperture 18 which is disposed in the reinforcing formation 24. FIG. 6 illustrate the cross-section of the hanger bar in an area of the second end region 16. As illustrated, the hanger bar 10 preferably has no concave or convex formations in the corrugated area 20. A certain degree of flexibility is desirable in this region of the hanger bar. Preferably, the first and second surfaces 30, 34 are flat in this region.

A method of installing a hanger bar constructed according to the above description will now be explained by reference to FIGS. 10 and 11.

First the distance $D_S$ between spaced supports $S_1$, $S_2$ is measured. The hanger bar distance measurement $D_S$ is then transferred to the hanger bar 10, preferably by starting at the second end 16 and measuring toward the first end 14. This distance is noted on the hanger bar 10. The hanger bar 10 is then bent in the area B of one of the bend apertures 18 which is in close proximity to the measured distance $D_S$. The hanger bar may be bent until the first end region 14 is approximately perpendicular to the longitudinally elongated body 12. Once the hanger bar has been bent, its longitudinal length $L_{HB}$ should be no greater than the measured distance $D_S$. Preferably, the longitudinal length $L_{HB}$ of the hanger bar is slightly less than the measured distance $D_S$. This is accomplished by bending the hanger bar at a bend aperture 18 on the short side of the measured distance $D_S$ (i.e.— closer to the second end 16).

A fastener F is then inserted through fastener aperture 28 in the mounting flange 22, and driven into a vertical face VF of a support member $S_1$ to attach the second end 16 of the hanger bar. The hanger bar 10 is now partially installed as illustrated in FIG. 10.

At least one fastener F is inserted through at least one bend aperture 18 in the first end region 14 and driven into vertical face VF of another support member $S_2$ to attach the first end 14 of the hanger bar to the other support member $S_2$. In the embodiment illustrated two fasteners F are used to attach the second end 14 to the support $S_2$. When the longitudinal length $L_{HB}$ of the hanger bar is less than the measured distance $D_S$, the corrugated area 20 is stretched or elongated in the longitudinal direction so that the hanger bar 10 completely bridges the measured distance $D_S$, as illustrated in FIG. 11. Installation of the hanger bar 10 is now complete.

Alternatively, the hanger bar 10 could be installed as described above, except that the hanger bar 10 is bent at a bend aperture 18 that is on the long side of the measured distance $D_S$ (i.e.—closer to the first end 14), so that the longitudinal length $L_{HB}$ of the hanger bar 10 is greater than the measured distance $D_S$. The second end 16 is attached to a support member $S_1$, then the hanger bar is compressed at the corrugated area 20 in order to make the hanger bar fit within the measured distance $D_S$. The first end 14 is then attached to another support member $S_2$ as previously described.

As previously noted, hanger bars of the type described herein are frequently used to mount lighting fixtures between spaced ceiling supports or joists.

Figure 12:
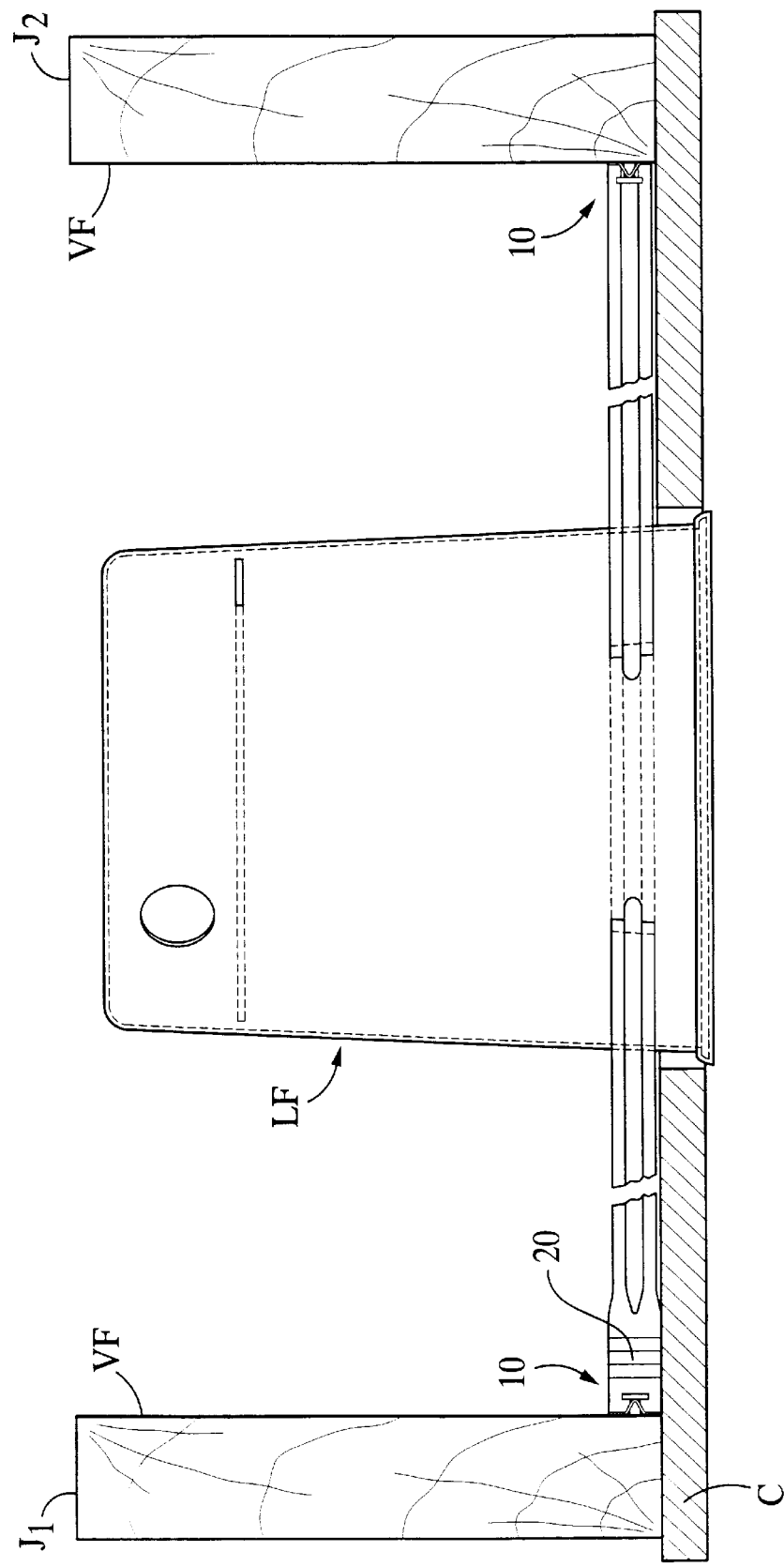
FIG. 12 is a schematic side view of a light fixture mounted between spaced supports by a plurality of hanger bars constructed according to the present invention.

Such an arrangement is illustrated in FIG. 12. a pair of hanger bars 10 are mounted between spaced ceiling joists $J_1$, $J_2$. Each end of a hanger bar 10 is attached to a vertical face VF of one of the joists $J_1$, $J_2$. A light fixture LF is suspended between the spaced bar hangers and projects through a hole in the ceiling material C.

Figure 13:
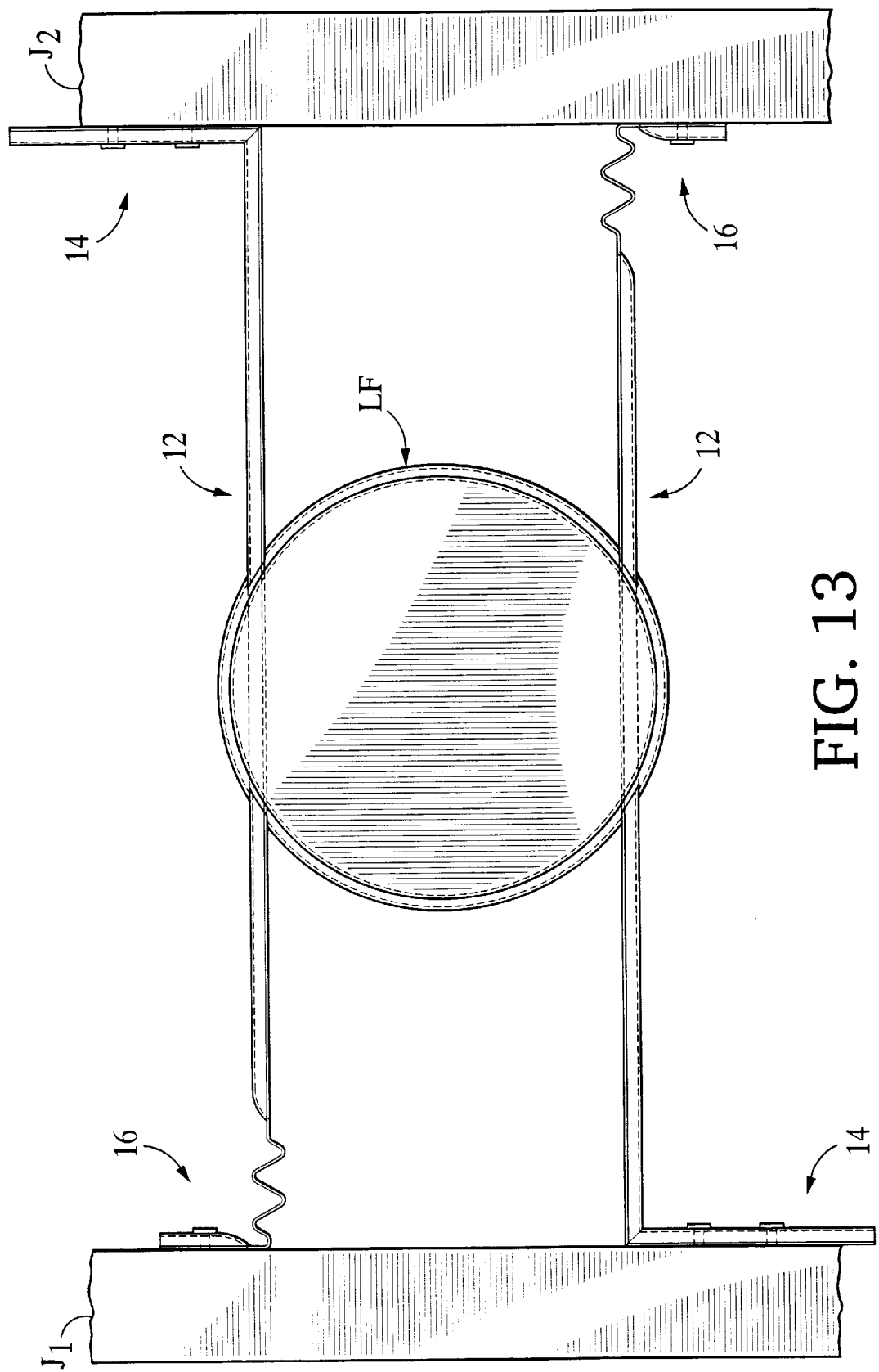
FIG. 13 is a top schematic view of a light fixture mounted between spaced supports by a plurality of hanger bars constructed according to the present invention.

FIG. 13 is a top view of the arrangement of FIG. 12. It is preferable to attach the second end 16 of each spaced hanger bar 10 to different supports or joists. This way the corrugated area 20 of the two hanger bars are not both located on opposite sides of the suspended light fixture. This arrangement provides added rigidity and stability to the arrangement.

It is also preferable to mount the hanger bars such that the corrugations (20A–20C) are transverse to the vertical direction (as defined by the vertical face VF) in order to improve rigidity and stability of the arrangement. It should be evident that if the corrugations (20A–20C) were disposed such that they extended vertically, the arrangement would be much more susceptible to sagging due to the flexibility of the corrugated area 20.

The light fixture LF and its attachment to the hanger bars have been illustrated schematically. Any suitable fixture could be suspended between spaced hanger bars. Similarly, such a fixture could be attached to the hanger bars by any suitable method. By way of example, U.S. Pat. No. 4,972,339 to Gabrius discloses an existing recessed light fixture assembly and a manner of attachment to spaced hanger bars. The disclosure of this patent, in its entirely, is incorporated herein by reference.

Only preferred embodiments of the invention are specifically illustrated and described herein. It should be appreciated that numerous modifications and variations of the present invention are possible in light of the present disclosure, such modifications and variations being encompassed within the scope of the appended claims without departing from the spirit an scope of the present invention.

What is claimed is:

1. A hanger bar comprising:

a longitudinally elongated body having a first end region, a second end region, and a longitudinal axis extending between the first and second region;

said elongated body is bendable at one or more locations proximate said first end region; and said second end region having a mounting flange extending substantially perpendicular to the longitudinal body, and a longitudinally flexible area, the longitudinally flexible area being flexible in a direction parallel to the longitudinal axis.

2. The hanger bar of claim 1, wherein said longitudinally flexible area comprises a plurality of corrugations.

3. The hanger bar of claim 2, wherein a plurality of apertures are provided in said hanger bar in the area of said corrugations.

4. The hanger bar of claim 1, wherein said hanger bar is formed from a strip of material having a predetermined thickness;

said longitudinally flexible area is of a predetermined configuration; and said predetermined thickness and predetermined configuration are such that the amount of force necessary to longitudinally expand the hanger bar by 0.25 inches, 0.50 inches, 0.75 inches, and 1.0 inches is approximately 18 lbf, 21.5 lbf, 25 lbf, and 32 lbf, respectively.

5. The hanger bar of claim 1, wherein a plurality of bend apertures are disposed along a substantial portion of said longitudinal body and along said first end region.

6. The hanger bar of claim 1, wherein a reinforcing formation is provided along a substantial portion of said longitudinal body.

7. The hanger bar of claim 6, wherein said reinforcing formation is in the form of a ridge-like projection.

8. The hanger bar of claim 1, wherein a reinforcing formation is provided along a substantial portion of said mounting flange.

9. The hanger bar of claim 8, wherein said reinforcing formation is in the form of a ridge-like projection.

10. The hanger bar of claim 1, wherein said mounting flange includes at least one fastener aperture disposed therein.

11. The hanger bar of claim 1, wherein said hanger bar consists essentially of a one-piece unitary member.

12. The hanger bar of claim 1, wherein said hanger bar is made from galvanized steel.

13. A hanger bar system comprising a plurality of spaced hanger bars constructed according to claim 1, and a suspended member located between said spaced hanger bars.

14. The hanger bar system of claim 13, wherein said suspended member comprises a light fixture.

15. The hanger bar of claim 1, wherein the longitudinal body comprises a single piece extending between and including the first end region and the second end region.

* * * * *